Oct. 5, 1948.  W. W. BEMAN  2,450,709
AIRCRAFT CONTROL
Filed Feb. 22, 1943  3 Sheets-Sheet 1
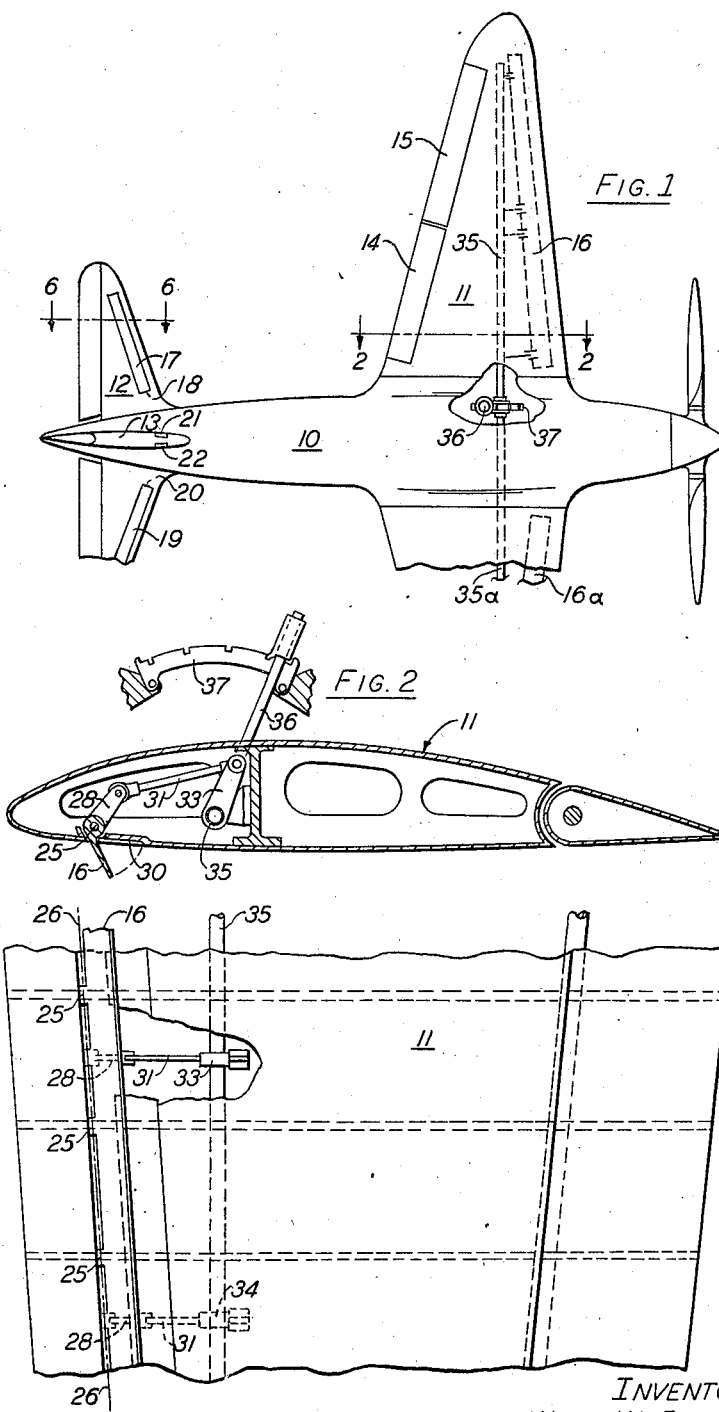
INVENTOR
WARD W. BEMAN
BY George C. Sullivan

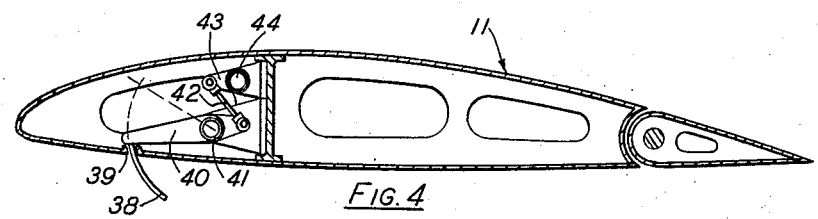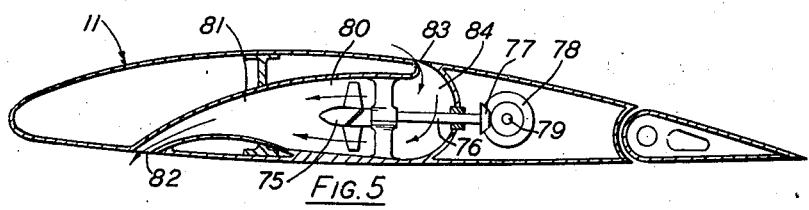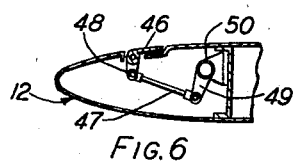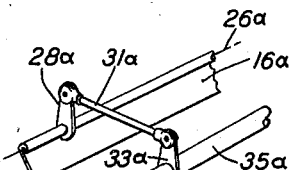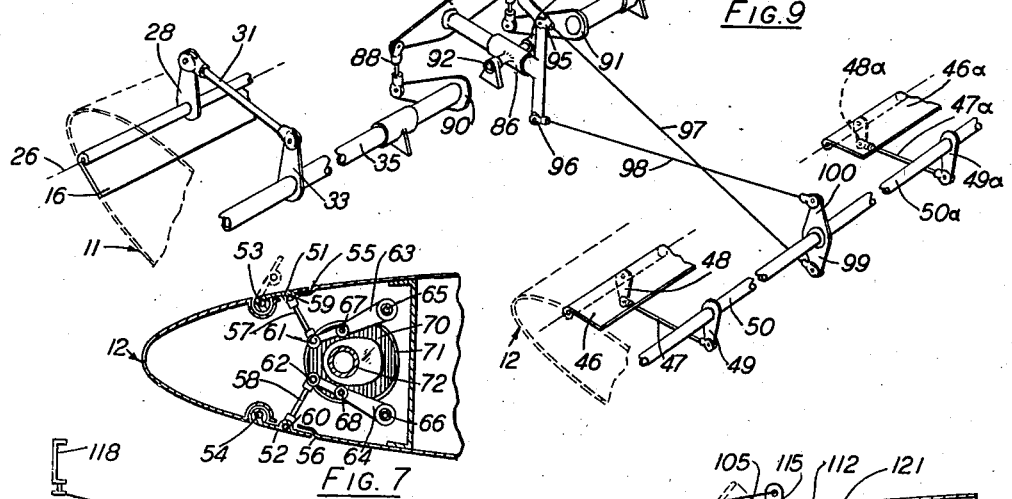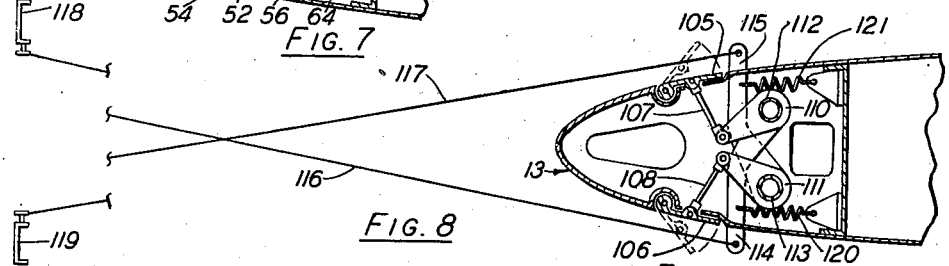

Patented Oct. 5, 1948

2,450,709

UNITED STATES PATENT OFFICE 2,450,709

AIRCRAFT CONTROL

Ward W. Beman, Glendale, Calif., assignor to Lockheed Aircraft Corporation, Burbank, Calif.

Application February 22, 1943, Serial No. 476,715

1 Claim. (Cl. 244—75)

This invention relates to airplane controls and particularly to the maintenance and variation of the lift of airfoils operating under conditions where compressibility effects occur.

At normal air speeds ranging up to approximately 400 miles per hour the flow of air about a conventional airfoil continues in a normal flow pattern without appreciable change in the normal lift, drag and pressure distribution characteristics familiarly associated with such airfoils. However, as air speeds are increased above this range, a critical condition is finally approached, at average air speeds in the neighborhood of 70 to 80 percent of the speed of sound, where local air speeds relative to portions of the airfoil surface become equal to or exceed the local speed of sound. When this condition is reached, a radical change in the type of flow takes place, and further increase in air speed results in an attendant sudden decrease in lift coefficient with simultaneous increase in drag coefficient and diving moments and at times severe buffeting effects occur. This phenomenon is known as the compressibility effect.

It is also found that under such compressibility effect conditions the conventional devices for increasing or varying the lift coefficients of airfoils such as the hinged trailing edge types usually employed for ailerons, elevators and rudder controls and the similar forms of high lift devices such as trailing edge flaps which vary the effective camber of the airfoils become practically inoperative. In fact, all known means for lift variation when employed at or adjacent to the trailing edge become substantially ineffective to modify the lift characteristics of the airfoil under such critical speed conditions.

Consequently when airplanes employing normal airfoils and conventional control devices attain speeds approaching or exceeding such critical speeds at which compressibility effects occur by reason of having been put into steep dives or other causes, accidental or intentional, they may become suddenly unmanageable and may continue in dives from which recovery cannot be effected.

It is therefore an object of this invention to overcome the hazards of flying under conditions where compressibility effects occur and to provide a method and means for maintaining control of an airplane at all times while flying under such critical conditions.

It is another object of this invention to provide a method and means to inhibit adverse compressibility effects associated with an airfoil operating within the critical speed range conditions.

It is another object of this invention to provide a method and means to restore and vary the coefficient of lift of an airfoil otherwise rendered substantially inoperative by reason of compressibility effects.

It has been discovered that spanwise arranged extendable baffle devices of relatively small dimensions, which when located in the forward position of the airfoil surface, on the pressure or anti-lift side, are ordinarily ineffective at normal speed ranges, become particularly effective in this position for modifying the lift coefficient of the airfoil when operating in the critical speed range in which compressibility effects occur. For example, a small baffle adapted to extend from the lower surface of the airfoil at a position in the forward portion of the chord from the leading edge has been found to be capable of restoring the lift which has been lost due to compressibility effects to a value substantially equal to that of the same airfoil operating in the lower speed regime.

The objects of the invention are attained in general by modifying the air flow over the surface of airfoils in such manner as to inhibit the occurrence of super-critical local air speeds adjacent to such surfaces.

Other objects and features of novelty will be evident hereinafter.

In the accompanying drawings which illustrate preferred embodiments of the invention and where the same reference characters indicate the same or similar elements:

Figure 1 is a plan view showing the general arrangement and location of the apparatus adapted to accomplish the objects of the invention as applied to a typical airplane.

Figure 2 is a cross-section of an airfoil as taken on line 2—2 of Figure 1 showing a typical application of the apparatus of the invention.

Figure 3 is an enlarged fragmentary view of the bottom surface of the airplane wing of Figures 1 and 2.

Figures 4 and 5 are cross-sectional views of optional arrangements of apparatus of Figure 2.

Figures 6, 7 and 8 are fragmentary cross-sectional views of the leading edge and forward portion of an airfoil as taken on line 2—2 or line 6—6 of Figure 1, showing optional arrangements of the apparatus.

Figure 9 is a schematic arrangement of an optional manual control for the apparatus of the invention.

Figure 10:
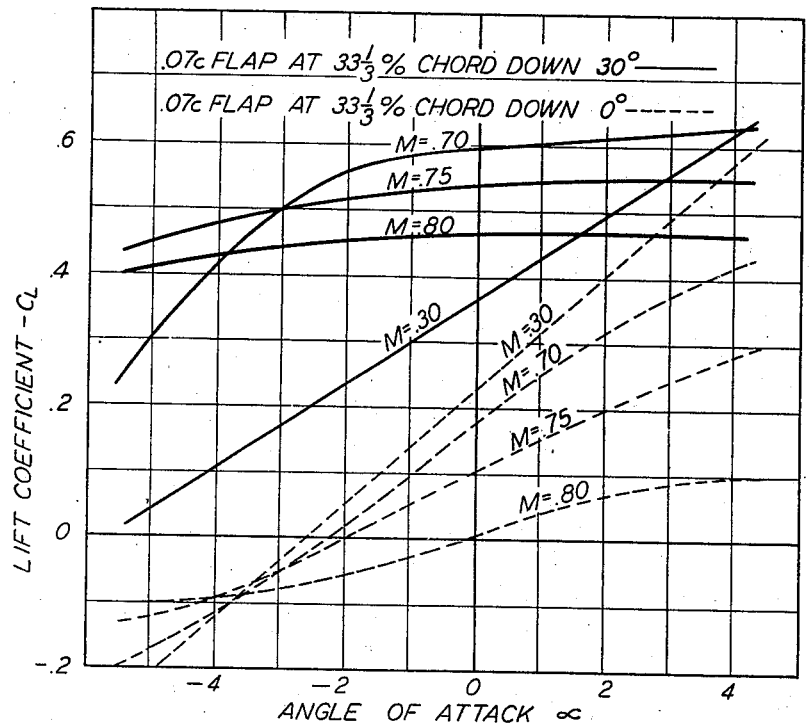
Figure 11:
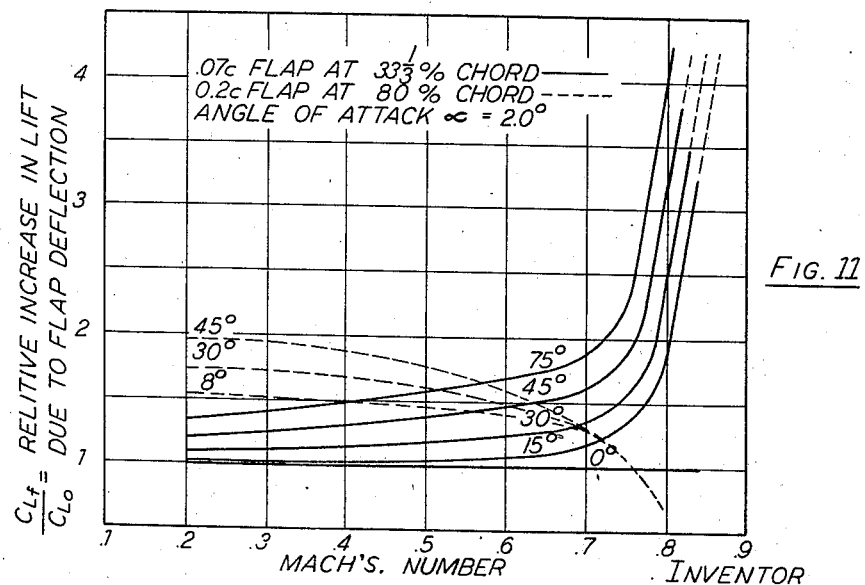

Figure 10 is a graph showing the relation between lift coefficient and angle of attack for a typical airfoil employing the apparatus of this invention, and Figure 11 is a graph indicating the relative merits of the invention.

The apparatus is as follows:

Referring primarily to Figure 1, 10 is a fuselage, 11 a main wing and 12 and 13 horizontal and vertical stabilizers of a typical airplane. The main wing 11 carries depressible trailing edge flaps 14 and ailerons 15 of conventional design and control flaps 16 and 16a of unusual design and arrangement as hereinafter more fully described in connection with Figures 2 to 9. The horizontal and vertical stabilizers 12 and 13 may also carry forwardly located control flaps as shown at 17 to 22, as more fully described in connection with Figures 6 to 8.

Referring now primarily to Figures 2 and 3, a baffle strip 16 is pivotally attached by means of suitable means such as an elongated piano type hinge or upon a plurality of spaced hinge points arranged as shown at 25 at suitable supports such as the rib points within the lower skin surface of the forward portion of the wing structure. The baffle is adapted to be rotated about the hinge line 26 extending through the hinges 25 by suitable lever arms as shown at 28 through an angle of approximately 90° from a fully extended position to a fully retracted position within the recess 30 to form at the latter position a flush, uninterrupted wing skin surface. The hinge line 26 may be placed at substantially any forward, chordwise position, but for maximum effectiveness of the baffle in the manner of the present invention it is preferably located at a line between approximately 5 to 33 percent of the chord length from the leading edge. The baffle chord should be relatively short, in the neighborhood of 1.0 to 15 percent of the wing chord for the purposes of this invention.

The beforementioned main wing baffles 16 and 16a are adapted to be actuated as shown in Figures 2 and 3 by lever 28 attached to the baffle and through pull-rod 31, lever 33 carried by the spanwise torque tube 35 and hand lever 36. The hand lever 36 may be located within reach of the pilot within the flight compartment and may be adjustably positioned on the slotted sector 37 for various degrees of baffle opening.

In an optional arrangement shown in Figure 4, a spanwise positioned spoiler type of baffle 38 is adapted to be slidably extended or lowered through a slot 39 in the forward portion of the lower wing-skin surface, by means of a suitable lever 40 pivotally supported at 51 within the wing structure. The crank 40 and in turn the baffle is actuated by means of a push-pull rod 42, extending to a crank 43 which is in turn carried on a torque tube 44 which extends spanwise from the interior of the wing to suitable control levers within the fuselage as described in connection with Figures 2 and 9.

In Figure 6 a control baffle 46 is shown which is constructed and operated in a manner similar to that shown at 16 in Figure 2 with the exception that the baffle is located in the upper skin surface of the airfoil. The baffle 46 is adapted to be operated by means of pull-rod 47 extending between crank 48 and 49, the latter one of which is fixed to the spanwise positioned torque tube 50, the inner end of which may be connected to a lever of the type shown at 36 in Figure 2 for manual operation. The arrangement of Figure 6 is primarily applicable to the horizontal stabilizer surfaces of the airplane.

In Figures 7 and 8 double baffle arrangements are shown, primarily adapted to be employed on the leading portion of the horizontal and vertical stabilizers in the positions indicated at 17 to 22 in Figure 1, but these may also in some cases be applicable to main wing installations. In the apparatus of Figure 7, which is best suited to the horizontal stabilizer airfoils, the upper and lower baffles 51 and 52 are respectively hinged at the upper and lower skin surfaces at 53 and 54 and are arranged to lie flush within recesses 55 and 56 in their retracted positions. The baffles are adapted to be actuated by push rods 57 and 58 which pivotally interconnect the mid-points 59 and 60 of the baffles with the ends 61 and 62 of levers 63 and 64, which are in turn pivotally supported upon fixed centers 65 and 66, carried on the interior of the wing structure. The levers 63 and 64 carry intermediately positioned cam follower rollers 67 and 68 which fit into and are adapted to be positively moved by the cam groove 70 of the cam plate 71 which is in turn fixed to a torque tube 72 which extends spanwise into the fuselage. The said torque tube may be actuated by a suitable lever located in the flight compartment as before mentioned in connection with Figure 2. The cam groove 70 is so shaped that in the neutral position shown in Figure 7, both baffles 51 and 52 are held closed, but upon rotation of the cam through a small angle in either direction from this position it will differentially force open either one or the other of the baffles.

Referring now to Figure 5, a modified form of apparatus for performing the invention is shown in which 75 is a blower impeller housed in a suitable duct within the wing structure and driven by suitable means, not shown, through shaft 76, bevel gears 77 and 78, and shaft 79. The impeller 75 is arranged to operate within a cylindrical casing 80, the outlet end of which leads through a laterally flared duct 81 to a forwardly directed slot 82 opening out through the lower airfoil skin at a point a short distance to the rear of the leading edge. A slot 83 leading through the upper skin of the airfoil and opening into the curved duct 84 constitutes the inlet passage to the suction side of the blower 75.

In Figure 9 an articulated control system is illustrated which is suitable for operating any of the types of the baffles shown and described in connection with Figures 2, 4, 6 and 7 and by means of which complete lateral and longitudinal control of the airplane may be maintained at all times during flight under speed conditions in which compressibility effects occur. For convenience the apparatus of Figure 9 is shown and now described in connection with the flap types of control baffle illustrated in Figures 2 and 6, although as just stated the same control may obviously be operatively coupled to any of the other single or double control baffle arrangements herein shown and described. The vertical control column 85 is universally pivoted in a movable bearing 86 for lateral angular movement about the longitudinal axis of the airplane to effect differential motion of the spoilers or flap types of baffles 16 and 16a. The differential motion is transmitted from the control column 85 through the cross-beam 87, linkages 88 and 89 and cranks 90 and 91 which are fixed to the inner ends of the laterally extending torque tubes 35 and 35a.

The bearing 86 is supported at 92 and 93 for pivoting about a lateral axis, coinciding with the axes of the torque tubes 35 and 35a whereby the control column is also free to swing longitudinally. Longitudinal angular motion of the control column 85 which is transmitted through the cross-beam 87 and simultaneously through links 88 and 89 and levers 90 and 91 results in concurrent angular motion of both the baffles 16 and 16a, whereby forward and rearward motion of the control column simultaneously retracts and extends both of the baffles. Universal motion of the control combining both lateral and longitudinal motion is thus adapted to effect lateral and longitudinal control of the airplane in the same sense as that conventionally obtained from similar controls simultaneously operating the conventional types of aileron and elevator control surfaces.

The control column may also be connected at 95 and 96 through cables 97 and 98 to horns 99 and 100 carried at the midpoint of torque tubes 50 and 50a which extend laterally into the opposite leading edge portions of the horizontal stabilizer. In this arrangement where the apparatus is employed in the horizontal stabilizer, the baffle is located on the upper surface of the airfoil section (pressure or anti-lift side) as best shown in Figure 6. Elevator baffles 46 and 46a are adapted to be raised and lowered for additional longitudinal control by means of a linkage as shown at 47 which extends between cranks 48 and 49 on the baffle hinges and torque tube respectively, as best shown in Figure 6, whereby motion is transmitted from the said torque tube 50 to the baffle 46. The type of differential baffle control arrangement shown in Figure 7 may be optionally employed in the leading edge of the stabilizer in place of that illustrated in Figure 6, in which case the cable connection 97 and 98, horns 99 and 100, and lateral torque tubes 50 and 50a may be employed as before described for its operation, but in this case the torque tubes 50 and 50a are connected directly to the baffle operating cam plates in the manner shown at 70, 71 and 72 in Figure 7.

Figure 8 illustrates another double flap baffle arrangement which is primarily suited to use in the vertical stabilizer at the points indicated at 21 and 22 in Figure 2. In this arrangement a pair of oppositely positioned baffles 105 and 106 are hinged in a manner similar to those of Figures 2 and 6 and extend for substantially the full height of the stabilizer. The baffles 105 and 106 are actuated by links 107 and 108 which make pivotal connection with the ends of levers 110 and 111. Levers 110 and 111 are carried on torque tubes 112 and 113 which extend vertically from the tail portion of the fuselage into the vertical stabilizer and levers 114 and 115 are fixed to the lower ends of the said torque tubes 112 and 113 at a point within the fuselage and are adapted to be actuated through cables 116 and 117 from a pair of rudder pedals as shown at 118 and 119. A pair of springs 120 and 121 connected between intermediate points of levers 114 and 115 to suitable points of attachment in the structure and acting in tension serve to apply sufficient moment through the torque tubes 112 and 113 and levers 110 and 111 to retain the baffles 105 and 106 normally in closed positions as shown.

The apparatus of Figure 8 may optionally be employed in the leading edge portions of the horizontal stabilizer and may be operated through cables 97 and 98 in a manner similar to that shown in Figure 9.

The operation of the invention first with reference primarily to Figures 1 to 3 is as follows:

When the airplane has attained a speed at which compressibility effects have rendered the airplane substantially uncontrollable by the usual means of elevators, ailerons and trailing edge wing flaps, and if, for example, the airplane is in a dive from which recovery is necessary, the main wing baffles 16 and 16a may both be extended by the pilot by operating the lever 36. The angle to which the baffles are extended may be adjusted in accordance with the desired rate of recovery and retained in such position by the notched sector 35 until recovery is accomplished. When the airplane has again reached a normal attitude the baffles 16 and 16a may then be returned to their retracted positions or adjusted to an intermediate position as required for control under the continued flight speed.

The apparatus of Figure 4 may be optionally employed in place of that shown in Figure 2 and actuated and adjusted in the same manner by means of the lever 36 located within the flight compartment.

Where more complete control about all axes of the airplane is to be maintained particularly under prolonged flight conditions at which compressibility effects continuously occur the combined apparatus of Figures 2, 6 and 8 may be employed to advantage. In this arrangement pitching moment is varied by fore and aft movement of the control column 85 shown in Figure 9. Thus rearward motion of the control column 58 causing it to pivot about its supporting gearings 92 and 93 results in simultaneous extension of both of the baffles 16 and 16a to increase the lift of the main wing whereby the lift and stalling moment is increased, and conversely a forward movement of the control column 85 retracts the baffles 16 and 16a to reduce the stalling moment or relatively speaking to increase the diving moment. The fore and aft movement of the control column acting through cables 97 and 98 respectively also causes extension and retraction of the baffles 46 and 46a in the upper surfaces of the horizontal stabilizer 12. Thus rearward motion of the control column 85 causes the baffles 46 and 46a to be progressively extended to increase the down load on the stabilizer, and forward motion of the control column causes the baffle to be retracted to decrease the down load on the stabilizer surfaces. In this manner the effectiveness of the stabilizer for varying the pitching moments required for longitudinal control may be retained even when conditions are such that the compressibility effects have rendered the normal elevator controls useless. However, maintenance of the effectiveness of the stabilizer in this manner would not alone usually be sufficient to obtain the variation in pitching moment required for complete longitudinal control without the simultaneous cooperative assistance of the beforementioned main wing baffles which are required to maintain or increase the coefficient of lift of the main wing as conditions require. In other words, without the assistance of the main wing flaps, compressibility effects may so greatly reduce the effective coefficient of lift of the main wing that any practical amount of variation of pitching moment by stabilizer baffles may be insufficient to maintain the required lift for sustained level flight.

Lateral motion of the control column 85 results in differential extension and retraction of the baffles 16 and 16a whereby the lift on the wings may be differentially varied for lateral control.

For the more complete controllability of the airplane about all axes which is desirable for maneuverability at all possible attitudes, the double baffle arrangement of Figure 7 is preferably utilized on both the main wing and the horizontal stabilizer and these may be actuated by the same articulated control apparatus shown in Figure 9. The double baffle arrangement of Figure 7 has the advantage of a wider possible range of variations in lift from negative to positive values and finds its greatest usefulness where rapid variations in both diving and stalling moments are required as for sudden diving and rapid climbing and also when longitudinal control must be maintained at any attitude such as, for example, when the airplane is in inverted flight. With this arrangement, forward movement of the control column beyond vertical positions results in extension of the upper main wing baffle 51 and the lower stabilizer flap corresponding to baffle 52 shown in Figure 7, thus increasing the diving moment. Rearward motion of the control column 85 beyond the neutral position results in extension of the lower main wing baffle corresponding to that shown at 52 and the upper stabilizer baffle corresponding to that shown at 51 in Figure 7, thus increasing the stalling moment. Side to side motion of the control column 85 results in differential lift variation on the main wings to effect lateral control as hereinbefore described.

Directional control may be effected by the rudder controls operating upon the vertical stabilizer differential baffle mechanism hereinbefore described in connection with Figure 8. Forward pressure on the right hand rudder pedal 118 acting through cable 116 moves the lever 114 forward resulting in extension of the right hand stabilizer baffle 105 to effect a right hand yawing moment. Similarly, pressure on the left hand rudder pedal 119 acting through cable 117 moves the lever 115 forward resulting in extension of the left hand stabilizer baffle 106 to effect a yawing moment to the left. Simultaneous pressure on both rudder pedals results in simultaneous opening of both of the vertical stabilizer baffles 105 and 106. Operation in this manner to partially or differentially open both of the baffles 105 and 106 has been found advantageous to maintain directional control of the airplane and at the same time to reduce the buffeting of the vertical stabilizer and rudder which often occurs under compressibility conditions.

While the theory of operation of the forwardly located baffle in the high speed flow regime in which compressibility effects occur is not completely understood, it is recognized to be entirely unrelated in mode of operation to that of the usual wing flaps or other lift modifying devices operating at low speeds and which in effect alter the circulation about the airfoil section. The baffle as employed in the present case appears to serve as a means for controlled dissipation of the energy of compression, to increase the entropy of the compressed air stream at or behind the point on the airfoil where the compressibility shock wave forms. This point along the airfoil where the shock wave forms is that at which the varying local airspeed relative to the airfoil surface passes from a speed above to a speed below that of the speed of sound under the local conditions of temperature and density obtaining in that region, and the baffle is preferably placed closely adjacent to this point.

The effectiveness of the apparatus of this invention relative to that conventionally employed for control of the airplane under compressibility conditions is indicated in Figures 10 and 11.

Figure 10 serves to indicate three principal items related to the operation of the invention; first the marked deterioration of the lift coefficients of a conventional wing as the Mach's number is increased; second the relative ineffectiveness of a forwardly located flap or baffle to increase the coefficient of lift of the airfoil at a low Mach's number corresponding to moderate air speeds; and third the relatively great effectiveness of the same forwardly located baffle to increase the lift coefficient of the wing and recover its usefulness at high Mach's numbers.

With further reference to Figure 10, it will be observed that at a Mach's number of .30 corresponding to a moderate air speed, the lift coefficient for the typical airfoil, over a practical range of angles of attack of, say, $-4°$ to $+4°$ varies substantially linearly at a moderately steep angle forming a curve, having the familiar appearance associated with the lift characteristic curves of such airfoils. However, as the Mach's number is increased the lift coefficients for the same range of angles of attack progressively deteriorate and the slope of the resultant lift coefficient curves decrease until at a critical value in the neighborhood of a Mach's number of .80 the lift coefficients for the whole practical range of angles of attack are extremely low and the slope of the curve is such that only slight variation in lift can be effected by change in angle of attack.

However, again referring to the curves of Figure 10, it is found that if a forwardly located baffle is employed similar to that illustrated in Figure 2—in this special case by way of illustration a .07c flap located at $33\frac{1}{3}$ percent of the chord from the leading edge and lowered $30°$—the effective lift coefficients are greatly increased over substantially the whole practical range of angles of attack, the greatest relative improvement being in the critical range of Mach's numbers near .80 with which this invention is primarily concerned. In this connection it may be further observed that at a Mach's number of .30 the lift coefficients and characteristics of the airfoil with and without the extended baffle are roughly the same or similar whereas at the critical values of Mach's numbers the relative values of the coefficients for these conditions are most extreme. The curves of Figure 10 thus indicate the relatively great increases in coefficients of lift obtainable by use of a forwardly located baffle, which is available for recovery from a dive or maintaining lift where critical speed conditions have been reached or are being maintained.

Referring now to Figure 11, the curves there indicate the relative effectiveness of two types of baffles, one being the beforementioned forwardly located hinged flap type of baffle arrangement of this invention and the other a conventional trailing edge flap. It will be observed that at relatively low Mach's numbers corresponding to moderate air speeds the forwardly located baffle is considerably less effective than the conventional trailing edge flap in increasing the lift coefficient of the airfoil. However, in the higher ranges of Mach's numbers, the forwardly located baffle becomes relatively much more effective than the conventional flap and this trend continues until the effectiveness of the conventional flap falls off to practically zero at a critical value of about .80 whereas the effectiveness of the forwardly located flap rises abruptly in the same critical range. The curves of Figure 11 thus illustrate the marked effectiveness and advantage of the forwardly located baffle as a means of control under critical air speed conditions at which compressibility effects occur, as compared to the substantially complete ineffectiveness of the conventional control surface under the same critical conditions.

The foregoing is merely illustrative of a preferred method and embodiment of the invention and is not to be considered limiting. Many modifications may be made by those skilled in the art and the invention is to be understood to include any method and apparatus which accomplishes the objects of the invention within the scope of the appended claim.

I claim:

In an airplane designed for speeds involving high Mach numbers at which compressibility effects are encountered, the combination with a main wing and a stabilizer, of a baffle located in the lower forward portion of said main wing in the region where shock waves form when speeds are attained at which compressibility effects are encountered, a baffle located in the upper forward portion of said stabilizer, and means for simultaneously extending the baffles in said main wing and stabilizer to maintain the coefficient of lift of said main wing and to maintain the effective stabilizing down-load of said stabilizer when speeds are attained at which compressibility effects are encountered, whereby to maintain the positive pitching moment of the airplane.

WARD W. BEMAN.

REFERENCES CITED

The following references are of record in the file of this patent:

UNITED STATES PATENTS

| Number | Name | Date |
| --- | --- | --- |
| 1,854,043 | Korner | Apr. 12, 1932 |
| 1,879,717 | Sikorsky | Sept. 27, 1932 |
| 2,045,638 | Dormoy | June 30, 1936 |
| 2,049,188 | Alfaro | July 28, 1936 |
| 2,147,360 | Zaparka | Feb. 14, 1939 |
| 2,204,404 | Driggs | June 11, 1940 |
| 2,205,714 | Doepp | June 25, 1940 |
| 2,218,822 | Joyce | Oct. 22, 1940 |
| 2,263,992 | Joyce | Nov. 25, 1941 |
| 2,271,226 | Johnson | Jan. 27, 1942 |
| 2,357,680 | Molloy | Sept. 5, 1944 |

FOREIGN PATENTS

| Number | Country | Date |
| --- | --- | --- |
| 143,953 | Great Britain | June 10, 1920 |
| 272,455 | Great Britain | Dec. 1, 1927 |
| 456,335 | Great Britain | Nov. 3, 1936 |